United States Patent
Kim et al.

(10) Patent No.: US 9,461,495 B2
(45) Date of Patent: Oct. 4, 2016

(54) BATTERY WARM UP SYSTEM AND METHOD FOR WARMING UP BATTERY USING THE SAME

(71) Applicant: LG CHEM, LTD., Seoul (KR)

(72) Inventors: Sung-Jong Kim, Daejeon (KR); Soon-Ho Ahn, Daejeon (KR); Joong-Jae Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 14/495,638

(22) Filed: Sep. 24, 2014

(65) Prior Publication Data

US 2015/0008887 A1   Jan. 8, 2015

Related U.S. Application Data

(63) Continuation-in-part of application No. PCT/KR2014/004113, filed on May 8, 2014.

(30) Foreign Application Priority Data

May 8, 2013   (KR) .................. 10-2013-0052098
May 8, 2014   (KR) .................. 10-2014-0055109

(51) Int. Cl.
| | |
|---|---|
| *H02J 7/00* | (2006.01) |
| *H01M 10/44* | (2006.01) |
| *H01M 10/48* | (2006.01) |
| *H01M 10/633* | (2014.01) |
| *H01M 10/42* | (2006.01) |

(52) U.S. Cl.
CPC .......... *H02J 7/0063* (2013.01); *H01M 10/443* (2013.01); *H01M 10/486* (2013.01); *H01M 10/633* (2015.04); *H01M 2010/4271* (2013.01); *H02J 2007/0067* (2013.01)

(58) Field of Classification Search
USPC ....................................................... 320/136
See application file for complete search history.

(56) References Cited

U.S. PATENT DOCUMENTS

| | | | |
|---|---|---|---|
| 2009/0087723 | A1 | 4/2009 | Inda |
| 2009/0130541 | A1* | 5/2009 | Emori et al. .............. 429/61 |
| 2011/0115435 | A1* | 5/2011 | Kikuchi ................. 320/118 |
| 2012/0105010 | A1* | 5/2012 | Kinoshita ............... 320/136 |
| 2012/0293129 | A1* | 11/2012 | Naghshtabrizi et al. ..... 320/118 |

FOREIGN PATENT DOCUMENTS

| | | |
|---|---|---|
| JP | 2004-362949 A | 12/2004 |
| JP | 2009-087814 A | 4/2009 |

(Continued)

OTHER PUBLICATIONS

Machine translation of KR20080010698.*

*Primary Examiner* — Samuel Berhanu
(74) *Attorney, Agent, or Firm* — Birch, Stewart, Kolasch & Birch, LLP

(57) ABSTRACT

A battery warm up system according to the present disclosure includes a battery state measuring unit to measure a state of charge (SOC) of each module of a battery pack of a vehicle, a control unit to optionally output a forced discharging start signal and to output a balancing start signal, a forced discharging circuit unit to force at least one battery module among a plurality of battery modules of the battery pack to be discharged in response to the forced discharging start signal, and a balancing unit to balance the SOC of each of the battery modules in response to the balancing start signal.

18 Claims, 6 Drawing Sheets

(56) References Cited

FOREIGN PATENT DOCUMENTS

| KR | 10-0570726 B1 | 4/2006 |
| KR | 10-2006-0060830 A | 6/2006 |
| KR | 10-0912350 B1 | 8/2009 |
| KR | 10-2012-0114593 A | 10/2012 |
| WO | 2011/145250 A1 | 4/2009 |

* cited by examiner

BATTERY WARM UP SYSTEM AND METHOD FOR WARMING UP BATTERY USING THE SAME

CROSS-REFERENCE TO RELATED APPLICATION

The present application is a Continuation-in-part application of International Application No. PCT/KR2014/004113 filed on May 8, 2014, which claims priority to Korean Patent Application No. 10-2013-0052098 filed on May 8, 2013 in the Republic of Korea and Korean Patent Application No. 10-2014-0055109 filed on May 8, 2014 in the Republic of Korea, the disclosures of which are expressly incorporated herein by reference in their entireties.

BACKGROUND OF THE DISCLOSURE

1. Field of the Disclosure

The present disclosure relates to a battery warm up system and a method for warming up a battery using the same, and more particularly, to a system for warming up a battery using heat generation occurring during discharging of the battery and a method for warming up a battery using the same.

2. Description of the Related Art

Recently, improvement of energy efficiency and $CO_2$ emissions reduction is a target imposed on the automobile industries. In this context, automobile manufacturers are making continuous attempts to improve energy efficiency by using a lithium ion secondary battery having higher output and higher charging efficiency than a conventional lead storage battery.

However, a lithium ion secondary battery has a drawback that output characteristics drastically degrade when temperature drops down to a predetermined level, and this drawback of the lithium ion secondary battery is a problem that needs to be overcome to enhance cold startability of a vehicle.

SUMMARY OF THE DISCLOSURE

The present disclosure is designed to solve the above problem, and therefore the present disclosure is directed to improving cold startability of a vehicle significantly using heat generation of a battery itself while not causing a great change to an existing power supply system for vehicles.

Rather, the object of the present disclosure is not limited to the above, and the other objects will be better understood by those having ordinary skill in the art from the following detailed description.

To achieve the above object, a battery warm up system according to the present disclosure includes a battery state measuring unit to measure a state of charge (SOC) of each module of a battery pack of a vehicle, a control unit to optionally output a forced discharging start signal and to output a balancing start signal, a forced discharging circuit unit to force at least one battery module among a plurality of battery modules of the battery pack to be discharged in response to the forced discharging start signal, and a balancing unit to balance the SOC of each of the battery modules in response to the balancing start signal.

The battery warm up system may include a temperature measuring unit to measure a temperature of the battery pack and the control unit may output the discharging start signal when the temperature measured by the temperature measuring unit is lower than a first reference temperature.

The forced discharging circuit unit may include a forced discharging switch connected between both ends of at least one of the plurality of battery modules.

The force discharging switch may perform a switch ON operation in response to the forced discharging start signal.

The control unit may output a forced discharging end signal when a discharge amount of the certain battery module reaches a reference discharge amount or the temperature of the battery pack reaches a second reference temperature in response to the output of the forced discharging start signal.

The forced discharging switch may perform a switch OFF operation in response to the forced discharging end signal.

The control unit may output the balancing start signal when a SOC difference between the plurality of battery modules is greater than or equal to a first reference amount as the certain battery module is discharged by the forced discharging circuit unit.

The balancing unit may include a balancing switch connected between both ends of each of the plurality of battery modules.

The balancing switch may perform a switch ON operation in response to the balancing start signal.

The control unit may output a balancing end signal when a SOC difference between the plurality of battery modules is less than a second reference amount in response to the output of the balancing start signal.

The balancing switch may perform a switch OFF operation in response to the balancing end signal.

The battery state measuring unit may include a voltage sensor to measure a voltage of the battery module.

The battery state measuring unit may further include a SOC calculation unit to calculate a SOC of the battery module using information including a voltage value sensed by the voltage sensor.

The control unit may calculate a SOC of the battery module using information including a voltage value sensed by the voltage sensor.

To achieve the above object, a power supply system for vehicles according to the present disclosure may include the above battery warm up system and a battery pack connected to the battery warm up system.

To achieve the above object, a vehicle according to the present disclosure may include the above power supply system for vehicles and a starter to receive power needed for start-up from the battery pack.

To achieve the above object, a method for warming up a battery according to the present disclosure may include comparing a temperature of a battery pack to a first reference temperature, outputting a forced discharging start signal when the temperature of the battery pack is lower than the first reference temperature, and outputting a balancing start signal when a SOC difference between a plurality of battery modules constituting the battery pack is greater than or equal to a first reference amount in response to the forced discharging start signal.

The method for warming up a battery may further include outputting a forced discharging end signal when the temperature of the battery pack reaches a second reference temperature or a discharge amount of a certain battery module reaches a reference discharge amount in response to the output of the forced discharging start signal.

The method for warming up a battery may further include outputting a balancing end signal when a SOC difference between the plurality of battery modules is less than a second reference amount in response to the balancing start signal.

To achieve the above object, a method for warming up a battery pack having a plurality of battery modules according to the present disclosure may include a method with steps of referring to a SOC for each battery module of the battery pack, determining whether there is a charge imbalance among the battery modules based on the estimated SOC for each battery module, if a charge imbalance exists among the battery modules, outputting a balancing start signal to balance the SOC among the battery modules and, if a charge imbalance does not exist among the battery modules, first outputting a signal to induce a charge imbalance among the battery modules and then outputting the balance start signal to balance the SOC among the battery modules.

Outputting the signal to induce a charge imbalance may include outputting a forced discharging start signal whereby at least one of the battery modules of the battery pack is forcibly discharged and/or outputting a forced charging start signal whereby at least one of the battery modules of the battery pack is forcibly charged.

The method for warming up a battery pack may further include comparing a temperature of a battery pack to a first reference temperature and, when the temperature of the battery pack is lower than the first reference temperature, the balancing start signal or the signal to induce the charge imbalance is outputted.

The method for warming up a battery pack may further include measuring a temperature of the battery pack and outputting a balancing end signal when a temperature of the battery pack reaches a reference temperature.

The method for warming up a battery pack may further include outputting an end signal to stop inducing a charge imbalance when the charge imbalance reaches a reference amount.

The method for warming up a battery pack may further include outputting a balance end signal when a SOC difference between the plurality of battery modules is less than a reference amount in response to the balancing start signal.

According to the present disclosure, cold startability of a vehicle may be significantly improved using heat generation of a battery itself while not causing a great change to an existing power supply system for vehicles.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A battery warm up system 10 according to an exemplary embodiment will be described with reference to FIGS. 1 through 4.

Figure 1:
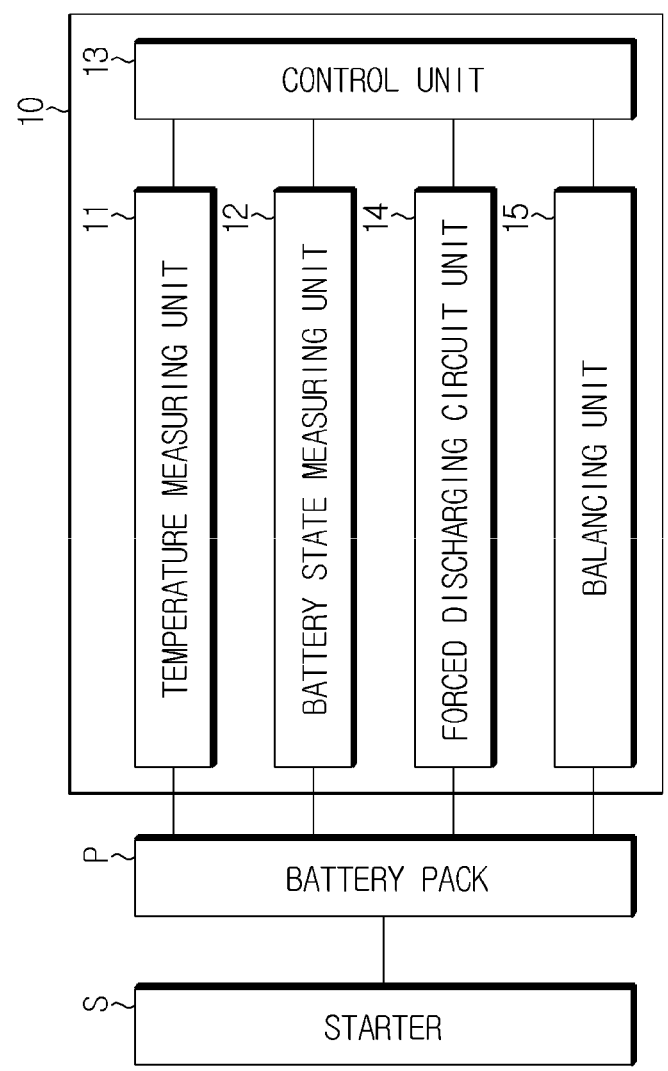
FIG. 1 is a block diagram illustrating a battery warm up system according to an exemplary embodiment.
Figure 2:
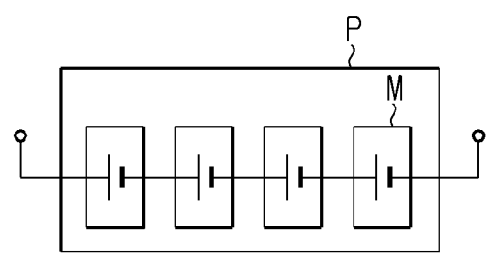
FIG. 2 is a diagram illustrating a battery pack connected to a battery warm up system according to an exemplary embodiment.
Figure 3:
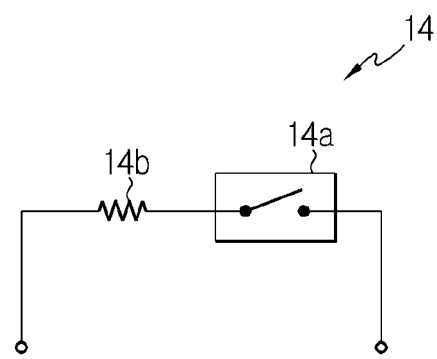
FIG. 3 is a diagram illustrating a forced discharging circuit unit employed in a battery warm up system according to an exemplary embodiment.
Figure 4:
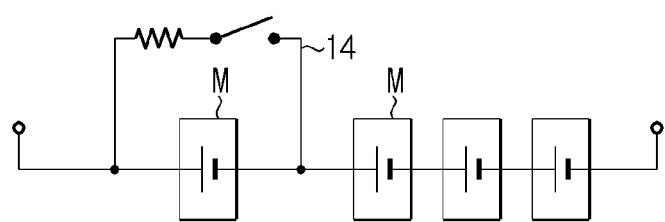
FIG. 4 is a diagram illustrating a combination of a battery pack and a forced discharging circuit unit employed in a battery warm up system according to an exemplary embodiment.

FIG. 1 is a block diagram illustrating a battery warm up system according to an exemplary embodiment, and FIG. 2 is a diagram illustrating a battery pack connected to the battery warm up system according to an exemplary embodiment. Also, FIG. 3 is a diagram illustrating a forced discharging circuit unit employed in the battery warm up system according to an exemplary embodiment, and FIG. 4 is a diagram illustrating a combination of the battery pack and the forced discharging circuit unit employed in the battery warm up system according to an exemplary embodiment.

First, referring to FIG. 1, the battery warm up system 10 according to an exemplary embodiment includes a temperature measuring unit 11, a battery state measuring unit 12, a control unit 13, a forced discharging circuit unit 14, and a balancing unit 15.

The temperature measuring unit 11 measures a temperature of a battery pack P connected to a starter S of a vehicle, and is attached to a specific position of the battery pack P to sense a temperature. This temperature sensing is performed to determine a warm up start time for the battery pack P by monitoring the temperature of the battery pack P made up of lithium ion secondary batteries of which output characteristics degrade when the temperature drops down to a predetermined level (for example, lower than 0° C.). Meanwhile, the battery pack P may be implemented, for example, by connecting a plurality of battery modules M (see FIG. 2) in series, each battery module including a plurality of lithium ion secondary battery cells (not shown) connected in parallel.

Information associated with the temperature sensed by the temperature measuring unit 11 is transmitted to the control unit 13, and may be used as a material for measuring a state of charge (SOC) of the battery pack P as well as a material for determining whether to operate the forced discharging circuit unit 13.

The battery state measuring unit 12 measures a SOC of each of the plurality of battery modules M (see FIG. 2) constituting the battery pack P, and information associated with the measured SOC may be used to determine a time for the control unit 13 described below to output a balancing start signal.

The battery state measuring unit 12 is a concept of including a voltage sensor (not shown) to measure a voltage of each of the battery modules M. Information including the voltage value measured by the battery state measuring unit 12 may be used as a material for calculating a SOC of the battery module M by the control unit 13.

However, this SOC calculation may be performed in the battery state measuring unit 12 directly, rather than the control unit 13. In this case, the battery state measuring unit 12 may further include a SOC calculation unit (not shown) to calculate a SOC of each of the battery modules M using information including the voltage value measured by the voltage sensor. Also, for correct SOC calculation, the SOC calculation unit may additionally use information associated with the temperature measured through the temperature measuring unit 11.

The control unit 13 outputs a forced discharging start signal by referring to the temperature measured by the temperature measuring unit 11 to discharge a certain battery module M among the plurality of battery modules M, and outputs a balancing start signal by referring to the SOC of each of the plurality of battery modules M to make the SOC of the battery modules M uniform.

More specifically, when the temperature of the battery pack P measured by the temperature measuring unit 11 is lower than a first reference temperature, which may be set to 0° C. or −5° C., for example, based on a specification for the battery pack P or expected usage/environment of the battery pack P, the control unit 13 outputs a forced discharging start signal for a certain battery module M to warm up the battery pack P.

Also, when a predetermined time has passed after the forced discharging start signal was outputted, the control unit 13 outputs a forced discharging end signal to terminate the forced discharging, and a time to output the forced discharging end signal may be determined based on, for example, the temperature of the battery pack P or a discharge amount of the battery module M.

That is, during warm up of the battery pack P, when the temperature of the battery pack P reaches a second reference temperature or the discharge amount of the battery module M reaches a reference discharge amount, the control unit 13 determines that the warm up is completed and outputs a forced discharging end signal. Here, the second reference temperature is set to have a higher value than the first reference temperature described in the foregoing or the discharge amount may be set based on a specification for the battery pack P or expected usage/environment of the battery pack P.

Moreover, it should be understood that the temperature and the discharge amount are related such that as the temperature of the battery pack P decreases and the first reference temperature is set to a lower value, a required discharge amount increases. The control unit may be provided with a look-up table that correlates temperatures and discharge amounts.

Meanwhile, when a SOC difference between the plurality of battery modules M caused by the forced discharging is greater than or equal to a first reference amount, the control unit 13 outputs a balancing start signal to reduce the SOC difference between the plurality of battery modules M, and in the process of balancing, when the SOC difference is less than a second reference amount, the control unit 13 outputs a balancing end signal.

There are different ways to determine a SOC difference between the battery modules M including determining a SOC difference between two modules arbitrarily designated, determining a difference between a maximum SOC and a minimum SOC, determining a standard deviation of SOCs of all the modules, and the like.

Here, a SOC difference between the battery modules M greater than or equal to the first reference amount may imply that a SOC difference between a battery module M exhibiting a maximum SOC and a battery module M exhibiting a minimum SOC is greater than or equal to the first reference amount, and in this instance, the first reference amount is preferably set to have a value smaller than or equal to the reference discharge amount described in the foregoing. This is to cause the other battery modules M to be discharged by the balancing performed due to the forced discharging of the certain battery module M.

Likewise, a SOC difference between the battery modules M less than the second reference amount may imply that a SOC difference between a battery module M exhibiting a maximum SOC and a battery module M exhibiting a minimum SOC is less than the second reference amount. However, this is for illustration only, and the present disclosure is not limited thereto.

That is, measuring uniformity of a SOC to determine whether to start or terminate balancing may be performed by various methods, and for example, uniformity of a SOC may be determined based on a difference between an average SOC of the plurality of battery modules M and a SOC of each battery module M.

Referring to FIGS. 3 and 4, the forced discharging circuit unit 14 includes a forced discharging switch 14a connected between both ends of the certain battery module M, and may further include a discharge resistor 14b to prevent an overcurrent from flowing during forced discharging. Although the drawing (FIG. 4) of the present disclosure shows that the forced discharging circuit unit 14 is connected to only one battery module M, the present disclosure is not limited thereto.

The forced discharging switch 14a allows the SOC of the certain battery module M to reduce by performing a switch ON operation in response to the forced discharging start signal outputted from the control unit 13, and in response to the forced discharging end signal, stops the discharging by performing a switch OFF operation. This forced discharging of the certain battery module M continues until a SOC reduction amount of the battery module M reaches the reference discharge amount or until the temperature of the battery pack P reaches the second reference temperature, as described in the foregoing.

The forced discharging of the certain battery module M through the forced discharging circuit unit 14 causes a SOC imbalance between the battery modules M, and in response thereto, balancing is performed to warm up the overall plurality of battery modules M.

The balancing unit 15 serves to make the SOC uniform when a SOC difference between the plurality of battery modules M is greater than or equal to the reference amount by the forced discharging.

This balancing may be performed, for example, in a manner of reducing a SOC by discharging the battery module M having a higher charge amount than other battery modules M. To perform balancing in this way, the balancing unit 15 may be implemented in a form of a discharging circuit similar to the forced discharging circuit unit 14 described previously. That is, the balancing unit 15 may include a balancing switch (not shown) connected between each battery module M to perform a switch ON/OFF operation in response to a balancing start signal and a balancing end signal, and may further include a resistor (not shown) to prevent an overcurrent from occurring during discharging.

As described previously, when a SOC difference between the battery modules M is greater than or equal to the first reference amount, the balancing switch may perform a switch ON operation, and as balancing is performed, when a SOC difference between the battery modules M is less than the second reference amount, the balancing switch may perform a switch OFF operation.

As described in the foregoing, when the temperature of the battery pack P drops down to the reference temperature, the battery warm up system 10 according to an exemplary embodiment forces a certain battery module M to be discharged, as a consequence, causing balancing to warm up the battery pack P. Accordingly, a power supply system for vehicles implemented by combining the battery warm up system 10 and the battery pack P may supply sufficient power to the starter S of the vehicle through warm up of the battery pack P, hence the vehicle may ensure excellent cold startability.

A method for warming up a battery according to an exemplary embodiment will now be described with reference to FIG. 5.

Figure 5:
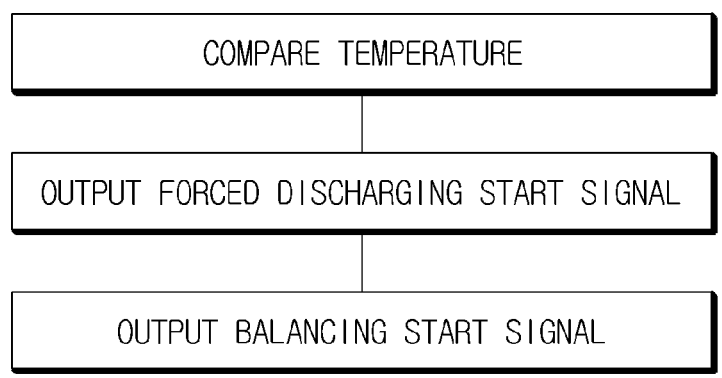
FIG. 5 is a flowchart illustrating a method for warming up a battery according to an exemplary embodiment.

FIG. 5 is a flowchart illustrating a method for warming up a battery according to an exemplary embodiment.

Referring to FIG. 5, the method for warming up a battery according to an exemplary embodiment relates to a method that warms up the battery pack P using the battery warm up system 10 described in the foregoing, and includes a temperature comparing step, a forced discharging start signal output step, and a balancing start signal output step.

The temperature comparing step is a step of comparing a temperature of the battery pack P measured by the temperature measuring unit 11 to a reference temperature. The forced discharging start signal output step is a step of outputting a forced discharging start signal to discharge a certain battery module M when the measured temperature of the battery pack P is lower than a first reference temperature as a result of comparing the measured temperature of the battery pack P to the reference temperature.

When the forced discharging start signal is outputted, the forced discharging switch 14a of the forced discharging circuit unit 14 performs a switch ON operation to allow a SOC of the battery module M to reduce as much as the reference discharge amount.

The balancing start signal output step is a step of outputting a balancing start signal to make SOCs between the battery modules M uniform when a SOC difference between the battery modules M is greater than or equal to a first reference amount due to a reduction in SOC of the certain battery module M in response to the forced discharging start signal.

When this balancing start signal is outputted, the balancing circuit unit 15 performs balancing to make the SOCs between the battery modules M uniform.

Meanwhile, the method for warming up a battery may further include a forced discharging end signal output step of outputting a forced discharging end signal when discharging is performed more than the reference discharge amount, and a balancing end signal output step of outputting a balancing end signal when a SOC difference between the battery modules M is less than a second reference amount, thereby terminating the forced discharging and balancing at a proper time.

As described above, the method for warming up a battery according to an exemplary embodiment forces a certain battery module M to be discharged under a predetermined condition, as a consequence, causing a balancing operation for the battery pack P to warm up the battery pack P, thereby the vehicle may have excellent cold startability.

Figure 6:
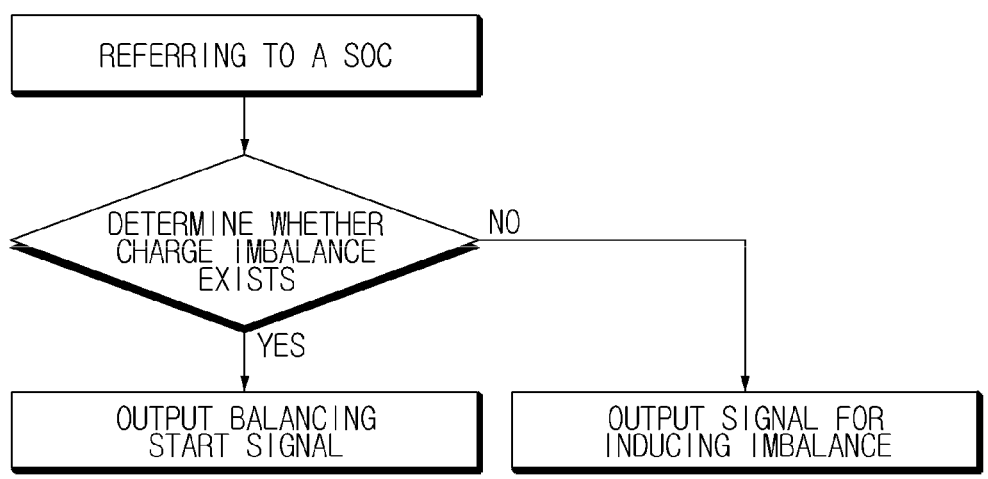
FIG. 6 is a flowchart illustrating a method for warming up a battery pack according to an exemplary embodiment

A method for warming up a battery pack according to an exemplary embodiment will now be described with reference to FIG. 6. FIG. 6 is a flowchart illustrating a method for warming up a battery pack according to an exemplary embodiment.

Referring to FIG. 6, the method for warming up a battery pack according to an exemplary embodiment relates to a method that warms up the battery pack P using the battery warm up system 10 described in the foregoing and includes a step of referring to a SOC for each battery module of the battery pack and a step of determining whether there is a charge imbalance among the battery modules. If a charge imbalance exists among the battery modules, the method includes a step of outputting a balancing start signal to balance the SOC among the battery modules. If a charge imbalance does not exist among the battery modules, the method includes a step of outputting a signal to induce a charge imbalance among the battery modules and then the step of outputting the balance start signal to balance the SOC among the battery modules.

The step of referring to a SOC for each battery module of the battery pack is a step that provides the SOC for each battery module M using the battery state measuring unit 12.

The step of determining whether there is a charge imbalance among the battery modules is a step that compares the SOC for each battery module M by the control unit 13 to determine whether there is a charge imbalance among the battery modules M.

If a charge imbalance exists, the balancing start signal to balance the SOC among the battery modules M is outputted to make SOCs between the battery modules M uniform. When this balancing start signal is outputted, the balancing circuit unit 15 performs balancing to make the SOCs between the battery modules M uniform.

If a charge imbalance does not exist, the signal to induce a charge imbalance is outputted by the control unit 15 and then the balancing start signal is outputted. The signal to induce a charge imbalance signal may be a signal forced discharging start signal whereby at least one of the battery modules M of the battery pack P is forcibly discharged. When the forced discharge start signal is outputted, the forced discharge switch 14a of the forced discharging circuit 14 for the one or more battery modules M performs a switch On operation to allow the SOCs for the one or more battery modules to be reduced.

It is understood that there are alternative approaches to induce a charge imbalance including outputting a forced charging start signal whereby at least one of the battery modules M of the battery pack P is forcibly charged. In some instances, it may be desirable to provide both a forced discharge and a forced charge.

Once the charge imbalance is induced, the balancing start signal may be outputted, as described above.

The method for warming up a battery pack may further include comparing a temperature of a battery pack to a first reference temperature and, when the temperature of the battery pack is lower than the first reference temperature, the balancing start signal or the signal to induce the charge imbalance is outputted.

The method for warming up a battery pack may further include outputting an end signal to stop inducing a charge imbalance when the charge imbalance reaches a reference discharge amount, and a balancing end signal output step may be performed when a SOC difference between the battery modules M is less than a reference amount, thereby terminating the forced discharging and balancing at a proper time. Alternatively, if a step of measuring a temperature of the battery pack is performed, the balancing end signal output step may be performed when a temperature of the battery pack reaches a reference temperature.

Meanwhile, in the description of the present disclosure, it should be understood that each element shown in FIG. 1 is distinguished logically rather than physically.

That is, since each element of the present disclosure corresponds to a logical component for realizing the spirit of the present disclosure, even though elements are integrated or divided, if functions are found to be identical or similar, the integrated or divided elements should be construed as falling within the scope of the present disclosure, regardless of the names they are called.

Hereinabove, the present disclosure has been described by specific embodiments and drawings, but the present disclosure is not limited thereto and it should be understood that various changes and modifications may be made by those having ordinary skill in the art within the spirit and scope of the disclosure and the appended claims and their equivalents.

What is claimed is:

1. A battery warm up system, comprising:
   a battery state measuring unit to measure a state of charge (SOC) of each battery module of a battery pack of a vehicle;
   a temperature measuring unit to measure a temperature of the battery pack;
   a control unit to output a forced discharging start signal when the measured temperature is lower than a first reference temperature, thereby to cause an SOC imbalance between the battery modules and to output a balancing start signal when the SOC imbalance is caused by forced discharging in response to the forced discharging start signal, wherein the extent of the SOC imbalance increases as the measured temperature decreases;
   a forced discharging circuit unit to force at least one of the battery modules among a plurality of battery modules of the battery pack to be discharged to cause the SOC imbalance between the battery modules in response to the forced discharging start signal; and
   a balancing unit to balance the SOC of each of the battery modules in response to the balancing start signal when the SOC imbalance is caused by the forced discharging.

2. The battery warm up system according to claim 1, wherein the forced discharging circuit unit comprises a forced discharging switch connected between both ends of at least one of the plurality of battery modules.

3. The battery warm up system according to claim 2, wherein the force discharging switch performs a switch ON operation in response to the forced discharging start signal.

4. The battery warm up system according to claim 3, wherein the control unit outputs a forced discharging end signal when a discharge amount of the certain battery module reaches a reference discharge amount or the temperature of the battery pack reaches a second reference temperature in response to the output of the forced discharging start signal.

5. The battery warm up system according to claim 4, wherein the forced discharging switch performs a switch OFF operation in response to the forced discharging end signal.

6. The battery warm up system according to claim 1, wherein the control unit outputs the balancing start signal when a SOC difference between the plurality of battery modules is greater than or equal to a first reference amount as the forced discharging is performed.

7. The battery warm up system according to claim 6, wherein the balancing unit comprises a balancing switch connected between both ends of each of the plurality of battery modules.

8. The battery warm up system according to claim 7, wherein the balancing switch performs a switch ON operation in response to the balancing start signal.

9. The battery warm up system according to claim 8, wherein the control unit outputs a balancing end signal when a SOC difference between the plurality of battery modules is less than a second reference amount in response to the output of the balancing start signal.

10. The battery warm up system according to claim 9, wherein the balancing switch performs a switch OFF operation in response to the balancing end signal.

11. The battery warm up system according to claim 1, wherein the battery state measuring unit comprises a voltage sensor to measure a voltage of the battery module.

12. The battery warm up system according to claim 11, wherein the battery state measuring unit further comprises a SOC calculation unit to calculate a SOC of the battery module using information including a voltage value sensed by the voltage sensor.

13. The battery warm up system according to claim 11, wherein the control unit calculates a SOC of the battery module using information including a voltage value sensed by the voltage sensor.

14. A power supply system for vehicles, comprising:
    a battery warm up system defined in claim 1; and
    the battery pack connected to the battery warm up system.

15. A vehicle comprising:
    a power supply system for vehicles defined in claim 14; and
    a starter to receive power needed for start-up from the battery pack.

16. A method for warming up a battery, the method comprising:
    comparing a temperature of a battery pack to a first reference temperature;
    outputting a forced discharging start signal when the temperature of the battery pack is lower than the first reference temperature, thereby to cause an SOC imbalance between the battery modules, wherein the extent of the SOC imbalance increases as the temperature of the battery pack decreases; and
    outputting a balancing start signal when the SOC imbalance is caused by forced discharging in response to the forced discharging start signal, thereby balancing a state of charge (SOC) difference between a plurality of battery modules constituting the battery pack.

17. The method for warming up a battery according to claim 16, further comprising:
    outputting a forced discharging end signal when the temperature of the battery pack reaches a second reference temperature or a discharge amount of a certain battery module reaches a reference discharge amount in response to the output of the forced discharging start signal.

18. The method for warming up a battery according to claim 17, further comprising:
    outputting a balancing end signal when a SOC difference between the plurality of battery modules is less than a second reference amount in response to the balancing start signal.

* * * * *